(12) United States Patent
Sabanai et al.

(10) Patent No.: US 9,335,909 B2
(45) Date of Patent: May 10, 2016

(54) DRAWING ASSIST DEVICE, DRAWING ASSIST PROGRAM, AND DRAWING ASSIST METHOD

(75) Inventors: Shunji Sabanai, Wako (JP); Yoichiro Komatsu, Wako (JP); Kenji Shimada, Pittsburgh, PA (US); Soji Yamakawa, Pittsburgh, PA (US)

(73) Assignee: Honda Motor Co., Ltd., Tokyo (JP)

( * ) Notice: Subject to any disclaimer, the term of this patent is extended or adjusted under 35 U.S.C. 154(b) by 1418 days.

(21) Appl. No.: 12/477,686

(22) Filed: Jun. 3, 2009

(65) Prior Publication Data

US 2010/0309115 A1    Dec. 9, 2010

(51) Int. Cl.
*G06T 11/20*    (2006.01)
*G06F 3/0484*    (2013.01)

(52) U.S. Cl.
CPC .................... *G06F 3/04845* (2013.01)

(58) Field of Classification Search
USPC ........................................................ 345/441
See application file for complete search history.

(56) References Cited

U.S. PATENT DOCUMENTS

| | | | | |
|---|---|---|---|---|
| 5,001,765 A * | 3/1991 | Jeanty | .......................... | 382/179 |
| 5,063,600 A * | 11/1991 | Norwood | ...................... | 382/186 |
| 5,502,803 A * | 3/1996 | Yoshida et al. | ................ | 715/201 |
| 5,513,309 A * | 4/1996 | Meier et al. | ..................... | 715/860 |
| 5,570,113 A * | 10/1996 | Zetts | ............................. | 345/173 |
| 5,594,810 A * | 1/1997 | Gourdol | ........................ | 382/187 |
| 5,602,570 A * | 2/1997 | Capps et al. | .................... | 345/173 |
| 5,636,297 A * | 6/1997 | Eller et al. | .................... | 382/293 |
| 5,781,663 A * | 7/1998 | Sakaguchi et al. | ............. | 382/189 |
| 5,864,635 A * | 1/1999 | Zetts et al. | ...................... | 382/187 |
| 6,304,674 B1 * | 10/2001 | Cass et al. | ....................... | 382/224 |
| 6,587,587 B2 * | 7/2003 | Altman et al. | ................. | 382/181 |
| 6,938,220 B1 * | 8/2005 | Shigematsu et al. | ........... | 715/863 |
| 7,129,927 B2 * | 10/2006 | Mattsson | ........................ | 345/158 |
| 7,289,121 B1 * | 10/2007 | Balakrishnan et al. | ........ | 345/441 |
| 7,330,184 B2 * | 2/2008 | Leung | ............................ | 345/441 |
| 7,696,998 B2 * | 4/2010 | Bae | ................................. | 345/441 |
| 2004/0037463 A1 * | 2/2004 | Calhoun et al. | ................ | 382/186 |
| 2005/0229117 A1 * | 10/2005 | Hullender et al. | ............. | 715/863 |
| 2006/0010400 A1 * | 1/2006 | Dehlin et al. | .................. | 715/856 |
| 2006/0082571 A1 * | 4/2006 | McDaniel | ....................... | 345/419 |
| 2006/0250393 A1 * | 11/2006 | Tsang et al. | .................... | 345/420 |
| 2008/0036773 A1 * | 2/2008 | Bae | ................................. | 345/442 |
| 2008/0246762 A1 * | 10/2008 | Ogata et al. | .................... | 345/420 |
| 2009/0051648 A1 * | 2/2009 | Shamaie et al. | ................ | 345/156 |
| 2009/0052785 A1 * | 2/2009 | Shamaie | ........................ | 382/209 |
| 2009/0109218 A1 * | 4/2009 | Koseki et al. | .................. | 345/422 |
| 2010/0116963 A1 * | 5/2010 | Sabanai et al. | ................. | 248/454 |
| 2011/0041100 A1 * | 2/2011 | Boillot | ........................... | 715/863 |

FOREIGN PATENT DOCUMENTS

| | | |
|---|---|---|
| JP | 07-168951 A | 7/1995 |
| JP | 08-194840 A | 7/1996 |

* cited by examiner

*Primary Examiner* — Xiao Wu
*Assistant Examiner* — Mohammad H Akhavannik
(74) *Attorney, Agent, or Firm* — Arent Fox LLP

(57) ABSTRACT

Provided is a drawing assist device and the like which assists a drawing operation while improving efficiency thereof. According to the drawing assist device of the present invention, whether or not a first factor of an element defined according to a positional trajectory of a pointer moved by an agent is adequate in design for a subject represented by the element is determined. The agent is notified if the determination result thereof is negative. According thereto, the agent can progress the drawing operation while confirming whether or not the subject drawn personally is adequate in design.

17 Claims, 14 Drawing Sheets

DRAWING ASSIST DEVICE, DRAWING ASSIST PROGRAM, AND DRAWING ASSIST METHOD

BACKGROUND OF THE INVENTION

1. Field of the Invention

The present invention relates to a drawing assist device and the like which assists an agent in a drawing operation.

2. Description of the Related Art

Generally in an object-based drawing editor in a CAD device or the like, input of an object is performed through an electronic pen, a digitizer, a mouse and the like after a menu on a liquid crystal display is selected or a menu on a tablet is touched. However, these operations are excessive compared with hand drawing.

Accordingly, there has been disclosed a drawing method (refer to Japanese Patent Laid-open No. H07-168951) in which a graphic pattern in descriptive geometry to which a hand-drawn object is similar is determined and the hand-drawn object is converted to the graphic pattern defined in descriptive geometry and is displayed on the liquid crystal display. According to this drawing method, a graphic pattern can be input and/or output without the need of selecting a menu on a liquid crystal display or touching a menu on a tablet.

Similar to the above method, there has been disclosed a drawing method in which a stereoscopic model is easily created by using an interaction approach (refer to Japanese Patent Laid-open No. H08-194840). According to this method, a stereoscopic model can be generated only by inputting a graphic pattern imaged by a user, without the need of inputting a coordinate representing a three dimensional space for the graphic pattern envisioned by the user or a command every time when the graphic pattern is inputted.

Furthermore, there has been proposed an element regulation approach in which a shape of a hand-drawn object (element) is regulated similar to a shape registered in a data base through pattern-matching between the shape of the object and each of a plurality of shapes registered in the data base.

However, according to the drawing method in which a hand-drawn object (element) is converted to a graphic pattern, the user can draw the element without being constrained by a dimension, shape and the like of the element; therefore, there is a possibility that the user may ignore a design constraint condition related to the element being drawing.

Further, according to the element regulation approach through pattern-matching, the element cannot be regulated to a shape which is not registered in the data base. Therefore, it is not free to draw by hand an element of arbitrary shape, which makes it appropriate to design a part of complicated shape.

Moreover, according to the drawing method in which a stereoscopic model (element) is easily created, a material, strength or the like for a part or the like molded on the basis of the drawn stereoscopic model is not taken into consideration. Therefore, a factor which is difficult to be confirmed visually, such as a mistaken selection on a material of the element which is being drawing or the like, may not be found out even for a relatively high-experienced user in design unless the user performs a test actually on a component made according to a designed subject. In addition, there is a possibility that a factor which is relatively difficult to be confirmed visually, such as insufficient strength caused by insufficient thickness of the element which is being drawing, is difficult to be discovered when a user is drawing the element, especially when the user is a beginner. It is also possible that the insufficient strength or the like may be discovered through confirmation from a third person after the drawing is finished. In these cases, it is necessary for the user to perform the drawing operation again from the beginning, which makes the operation troublesome.

Accordingly, there has been considered to create a mechanism to check whether or not a factor is adequate in design through a macro-assembler or the like, however, it is difficult to conduct interactive operations in the drawing operation with such a simple mechanism. Additionally, since know-how registration related to drawing is performed manually, it is troublesome to do maintenance of the data base, and consequently, it is difficult to make use of it in the long run.

SUMMARY OF THE INVENTION

The present invention has been accomplished in view of the aforementioned problems, and it is therefore a subject of the present invention to provide a drawing assist device and the like which assists a drawing operation while improving efficiency thereof.

The drawing assist device of the present invention comprises: a first interface configured to recognize a positional trajectory of a pointer moved by an agent; a display; and a controller configured to display on the display an element having a shape, posture or displacement, or a combination thereof (hereinafter, referred to as a first factor) complied with the positional trajectory of the pointer, wherein the controller is provided with a first arithmetic processing element configured to recognize the first factor of the element and evaluate a single or a plurality of index values indicating a design adequacy of a subject represented by the element on the basis of the recognition result; and a second arithmetic processing element configured to determine whether or not the index value evaluated by the first arithmetic processing element is confined in a reference range defined on the basis of the design adequacy of the subject and notify the agent of an information complied with the determination result.

According to the drawing assist device of the present invention, the first factor of the element can be defined freely according to the positional trajectory of the pointer moved arbitrarily by the agent without any constraints. Thereafter, whether or not the first factor of the element is adequate in design for a subject represented by the element is determined. The agent is notified if the determination result thereof is negative. According thereto, the agent can progress the drawing operation while confirming whether or not the subject drawn personally is adequate in design. As a result thereof, a possibility that a design problem is found after the drawing operation and the drawing operation should be re-performed can be remarkably reduced, and consequently, improving the drawing efficiency.

The determination result, one or both of the index value and the first factor, and the second factor are accumulatively stored with a relation labeled therebetween in the data base as a know-how. According thereto, the drawing operation can be performed while utilizing the know-how efficiently, without wasting the agent's time on the know-how accumulation.

Some other aspects of the present invention are listed in the following:

(1) The element can be recognized or defined according to the positional trajectory of the pointer moved arbitrarily by the agent without any constraints on the first factor.

(2) For an element, candidates of the first factor or the like complied with the second factor can be retrieved from the data base, and an adequate first factor can be selected from the retrieved candidates by the agent (as a format of the data base, in addition to a database soft, an excel format, a text format or the like is conceivable).

(3) When the first factor is modified, whether or not a new index value complied with the modified first factor is deviated beyond the reference range is determined again and whether or not the modification is adequate can be recognized by the agent.

(4) Since the know-how of the first factor or the like over the past can be stored in the data base accumulatively, the know-how can be effectively utilized as a learning result in designing various subjects.

DETAILED DESCRIPTION OF THE PREFERRED EMBODIMENTS

An embodiment of drawing assist device according to the present invention will be described in detail with reference to the drawings.

Figure 1:
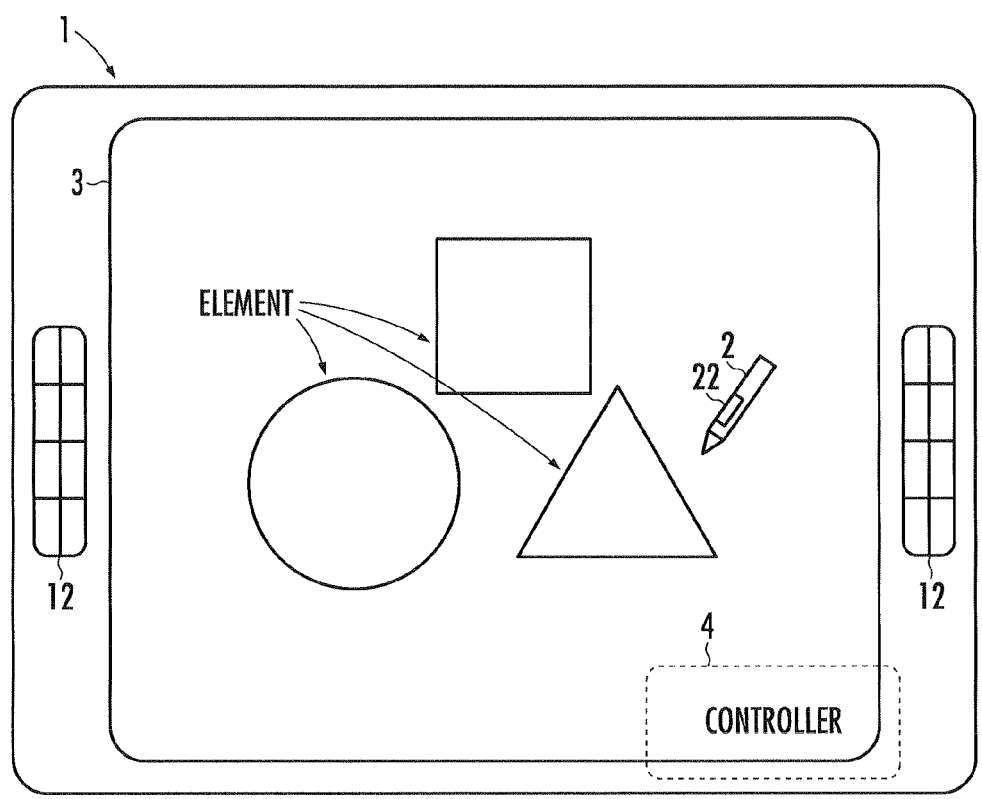
FIG. 1 is an explanatory diagram illustrating a configuration of a drawing assist device as an embodiment of the present invention.

A configuration of the drawing assist device will be described first. As illustrated in FIG. 1, the drawing assist device 1 is provided with a pen 2, a liquid crystal touch panel 3 and a controller 4.

The pen 2 represents a drawing tool held by an agent. It is acceptable to adopt a pointing device such as a mouse or the like as the drawing tool as a substitute for or in addition to the pen 2. The pen 2 is provided with an operation button 22 for performing various operations to be described hereinafter. Note that it is acceptable to configure a single key or a plurality of keys in a keyboard as the operation button 22. The keyboard serves as an input component in the drawing assist device 1.

The panel 3 includes a first interface configured to sense or recognize a positional trajectory of a contacting position or a pointer of the pen with respect to the panel 3. The positional trajectory denotes a temporal variation behavior of a position which is specified by, for example, a coordinate value in a rectangular coordinate system defined in the panel 3.

The panel 3 serves as a display to display an element having a first factor complied with the positional trajectory of the pointer. The first factor denotes a part or an entirety of a shape, posture and displacement. The position or the displacement is defined as the first factor by a dot. The shape, posture and displacement (end position, center position, barycentric position or the like) are defined as the first factor by a line segment and a painted block of a collection of dots or line segments and the like. The element is represented by the dot, the line segment and the painted block. Note that it is acceptable to dispose the display separated from the panel 3 constituting the first interface.

The main body of the drawing assist device 1 is provided with a plurality of operation buttons 12 disposed at both sides of the panel 3 laterally. At least a part of the operation buttons 12 constitute a second interface for recognizing a second factor of a subject represented by a single or a plurality of elements. The second factor is designated by the agent. The second factor denotes a part or an entirety of a material, a category, a manufacture requirement, an attachment requirement and an assembly requirement.

The operation buttons 12 enables the agent to switch between a drawing mode, an editing mode, a confirmation mode and the like. In addition, the operation buttons 12 enables the agent to switch between editing commands. The operation buttons 12 may be pressure-sensitive or touch-sensitive buttons disposed at the panel 3. Note that it is acceptable to configure a single key or a plurality of keys in a keyboard as the operation buttons 12. The keyboard serves as the input component in the drawing assist device 1.

The controller 4 is composed of a computer (having a CPU, a ROM, a RAM, an I/O circuit, an A/D circuit and the like) built in the main body of the drawing assist device 1. The CPU included in the controller 4 retrieves a drawing assist program of the present invention from a memory or a storing unit constituting the controller 4, and executes various arithmetic processes which will be described hereinafter according to the retrieved program to assist the agent in drawing operation.

The controller 4, served as a first arithmetic processing element, recognizes the first factor of the element complied with the positional trajectory of the pointer, and evaluates or calculates one or a plurality of index values indicating a design adequacy of a subject represented by the element on the basis of the recognition result. The first factor is determined on the basis of an output signal from a pressure-sensitive sensor or a touch sensor disposed at the panel 3.

The controller 4, served as a second arithmetic processing element, determines whether or not the index value is confined in a reference range defined on the basis of the design adequacy of the subject and notifies the agent that the subject is inadequate in design on a condition that the determination result is negative.

The first and second arithmetic processing elements may be composed of hardware resources which are physically common in part or on the whole, such as CPU and the like constituting the controller 4, or may be composed of independent hardware resources physically.

Note that the component of the drawing assist device 1 "recognizes" a piece of information means that the component performs a possible information processing on a piece of information to prepare the piece of information ready for other information processing, for example, retrieves the piece of information or data representing the piece of information from a memory or searches the piece of information in a database; measures, defines, calculates, estimates or the like the piece of information by performing an arithmetic processing on the retrieved basic information or an output signal from a sensor; or memorizes or stores in a storing unit (or memory) the piece of information or the like.

Hereinafter, descriptions will be given on functions of the drawing assist device 1 with the above-mentioned configuration, in other words, a drawing assist method performed by the controller 4.

Figure 2:
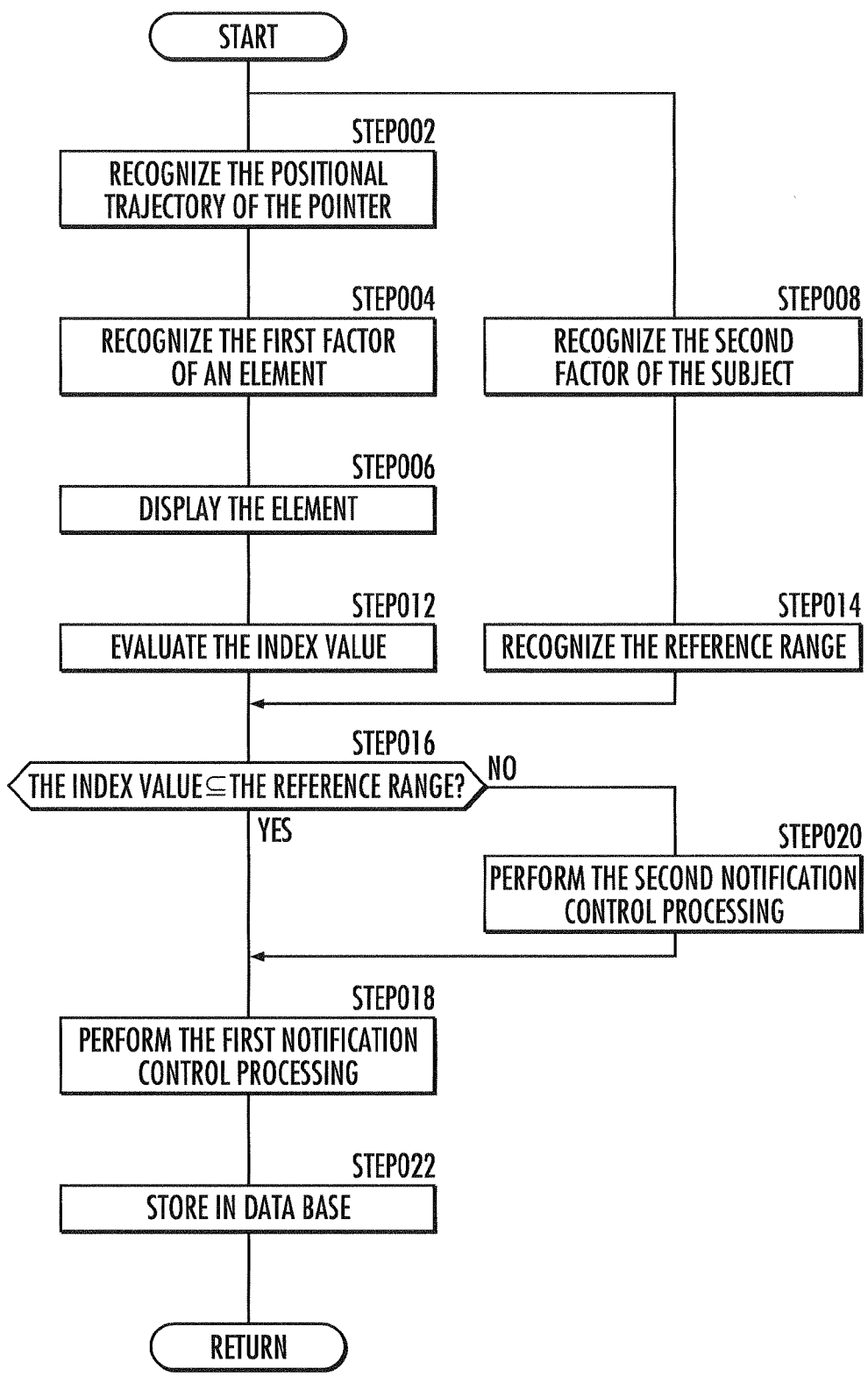
FIG. 2 is a flow chart illustrating a drawing assist method as an embodiment of the present invention.

Firstly, a positional trajectory of contacting points a tip end portion of the pen 2 on the panel 3 is recognized as the positional trajectory of the pointer through the panel 3 constituting the first interface (FIG. 2/STEP 002). It is acceptable to recognize a positional trajectory of a body part contacting the panel 3, such as a finger tip of the agent, as the positional trajectory of the pointer. A positional trajectory of a pointer which is displayed on the panel 3 and may be moved according to the movements of a pointing device, such as a mouse and the like, may be recognized as a substitute for or in addition to the positional trajectory of the tip end portion of the pen 2. It is acceptable to switch between a plurality of modes to be described hereinafter according to the positional trajectory (gesture) of the pointer recognized through the first interface, or according to an operation through a command key or a short-cut key.

Thereafter, on the basis of the positional trajectory of the pointer, the first factor of the element is recognized (FIG. 2/STEP 004).

In the drawing mode, a position or a displacement of a dot and a shape, posture and displacement (end position, center position, barycentric position or the like) of a line segment, or a painted block of a collection of dots or line segments are recognized as the first factor. When the position of the pointer is represented by a coordinate value (X, Y) in a coordinate system of the panel 3, the position (displacement) of a dot serving as the element is recognized as identical or different coordinate values in the coordinate system. In addition to the positional trajectory of the pointer itself, a resulted positional trajectory after being regulated, or with the position or posture thereof being varied slightly can be recognized as the element.

Figure 3:
FIG. 3(a) to FIG. 3(d) are illustrative diagrams related to recognition of an element in a drawing mode, respectively.
Figure 3:
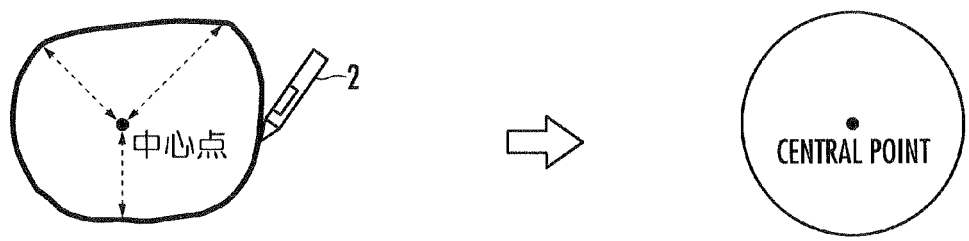
Figure 3:
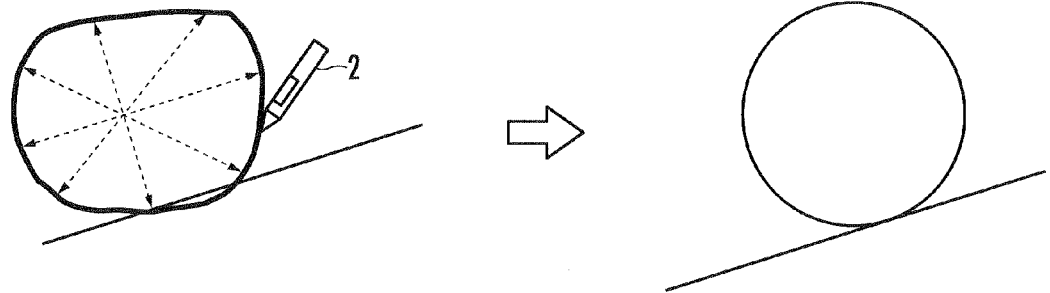
Figure 3:
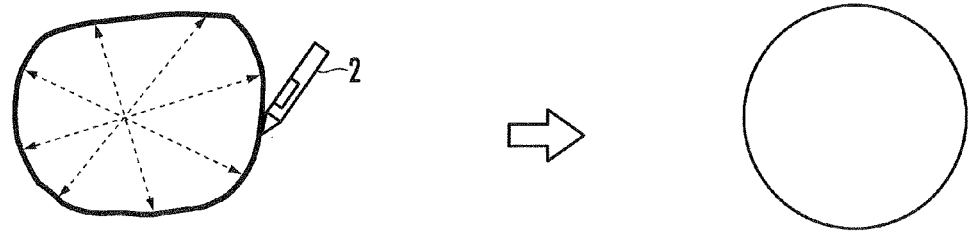

For example, when the positional trajectory of the pointer illustrated by a heavy line in the left side of FIG. 3 (a) is a line segment of a length less than a predefined value, a starting point of the line segment is recognized as the element, as illustrated in the right side of FIG. 3 (a). When the positional trajectory of the pointer illustrated by a heavy line in the left side of FIG. 3 (b) circles a dot which is an existing element (an element already displayed in the panel 3), a circle having the highest proximity to the positional trajectory with dot serving as the center point of the circle is recognized as the element, as illustrated in the right side of the FIG. 3 (b). When the positional trajectory of the pointer illustrated by a heavy line in the left side of FIG. 3 (c) is drawn as a closed area neighboring to or nearly overlapping with a line segment serving as the existing element, a circle tangent to the line segment with the center of gravity of the closed area serving as the center point of the circle is recognized as the element, as illustrated in the right side of FIG. 3 (c). When the positional trajectory of the pointer illustrated by a heavy line in the left side of FIG. 3 (d) is drawn as a closed area, a circle with the center of gravity of the closed area serving as the center point of the circle is recognized as the element, as illustrated in the right side of FIG. 3 (d).

Figure 4:
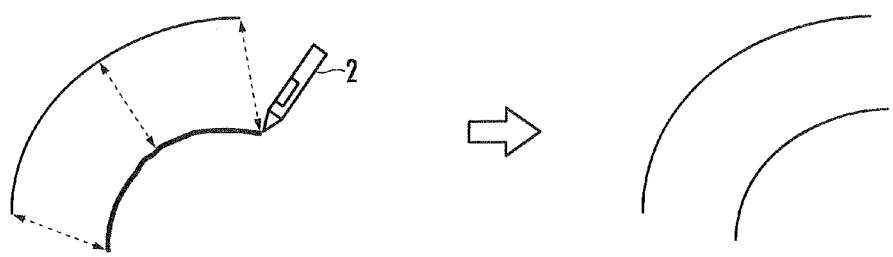
FIG. 4(a) and FIG. 4(b) are illustrative diagrams related to recognition of an element in the drawing mode, respectively.
Figure 4:
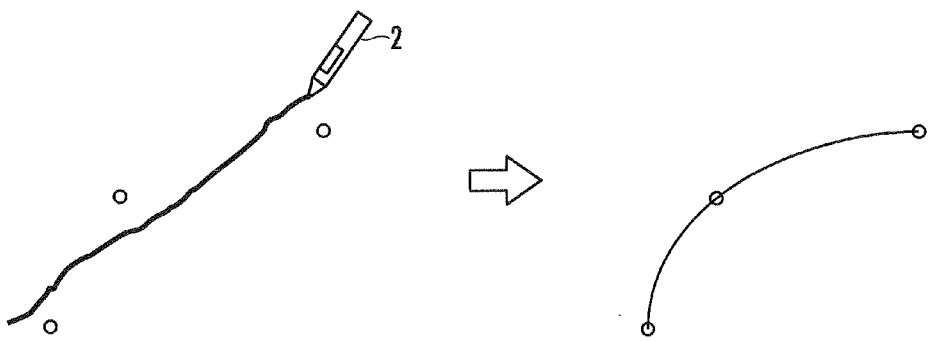

When the positional trajectory of the pointer illustrated by a heavy line in the left side of FIG. 4(a) is a line segment roughly parallel to one line segment serving as the existing element, a line segment parallel to the existed line segment is recognized as the element, as illustrated in the right side of FIG. 4(a). When the positional trajectory of the pointer illustrated by a heavy line in the left side of FIG. 4(b) is a line segment overlapping with or neighboring to a plurality of dots serving as the existing element, a line segment passing through the plurality of dots is recognized as the element, as illustrated in the right side of FIG. 4(b).

When a subject is drawn three-dimensionally, a rectangular coordinate value (x, y, z) or a polar coordinate value (r, θ, φ), which is a result of coordinate conversion from a rectangular coordinate value (X, Y) or a polar coordinate value (R, Θ) in a two dimensional coordinate system of the panel into a virtual three dimensional coordinate system on the basis of an axis facing the subject displayed on the panel 3 or a vector representing a viewpoint thereof, can be recognized. The coordinate value in the three dimensional coordinate system may be scaled according to the size of a subject in real space. The scaling ratio may be adjusted according to the category of a subject selected, which will be described hereinafter. For example, a scaling ratio of a relatively large subject (such as the entire body or the like of a vehicle) in real space is defined greater than a scaling ratio of a relative small subject (such as a front panel or the like of a vehicle) in real space.

When the shape of the positional trajectory of the pointer is linear, the shape of the line segment serving as the element is recognized as being linear. Moreover, the shape of a painted block serving as an element is recognized as being circular, rectangular, triangular, or the like. A closed area defined by an element may be recognized as the element defining the closed area and a painted block in the closed area serving as an element according to a gesture represented by the operations from the operation buttons 12 or the positional trajectory of the pointer.

It is possible that a single element is defined as plural categories of elements by the drawing assist device 1 according to a positional trajectory of a pointer. For example, a single element can be defined as either one of a dot and a very short line segment. In this case, the single element, which is determined by the drawing assist device 1 to have the highest likelihood among the plural categories of elements in consideration of the positional trajectory of the pointer, is displayed on the panel 3 as a first candidate. The first candidate is finally recognized as an element according to the lapse of a time interval, or a confirm operation performed by the agent through the operation button 12 or 22. On the other hand, when an $n^{th}$ candidate (n=1, 2, ...) is being displayed on the panel 3, according to a request operation for a subsequent candidate performed by the agent through the operation button 12 or 22, an $(n+1)^{th}$ candidate which has a higher likelihood subsequent to the $n^{th}$ candidate is displayed on the panel 3 by the drawing assist device 1 in place of the $n^{th}$ candidate. Thereafter, The $(n+1)^{th}$ candidate is finally recognized as an element according to the lapse of a time interval, or a confirm operation performed by the agent through the operation button 12 or 22.

It should be noted that it is acceptable to calculate the likelihood after taken into consideration of different drawing habits of different agents according to an identical or similar positional trajectory of a pointer. For example, for one agent, a very short line segment is calculated with higher likelihood than a dot when the positional trajectory of a pointer is extremely small; while on the other hand, for another agent, a dot may be calculated with higher likelihood than a very short line segment when the positional trajectory of a pointer is extremely small.

It should be noted that it is acceptable to calculate the likelihood after taken into consideration of a drawing situation according to an identical or similar positional trajectory of a pointer. For example, when a component of type A and a component of type B different from type A are being designed in a drawing operation, each element candidate can be calculated differently even though they are of identical trajectory.

It is acceptable that an element is selected as a candidate on a condition that a likelihood thereof is equal to or greater than a reference value so that the number of candidates to be displayed sequentially on the panel 3 according to the positional trajectory of the pointer as aforementioned will not become excessively great. By limiting the candidate number of an element, impairment to the operation according to the instinct of the agent may be avoided.

Therefore, according to a series of processes of the calculation of likelihood, display of a candidate according to the calculated likelihood and final confirmation of a candidate according to the selection of an agent, an element can be determined in an easy way advantageously through selection among a set of plural categories of candidates, saving the agent from selecting candidates one by one troublesomely.

In the editing mode, a variation behavior (gesture) of the subject element and the first factor is recognized on the basis of the positional trajectory of the pointer, and on the basis of the variation behavior, a new first factor of the varied subject element is recognized. For example, when that a length of a line segment serving as a subject element is varied is represented as a gesture, a new first factor including the varied length of the line segment is recognized in the three dimensional coordinate system. When that the central point of a line segment serving as a subject element is varied is represented as a gesture, a new first factor including the varied central point of the line segment is recognized in the three dimensional coordinate system. When that a posture (specified by a position or the like of the center of curvature) of a line segment serving as a subject element is varied is represented as a gesture, a new first factor including the varied posture of the line segment is recognized in the three dimensional coordinate system.

Figure 5:
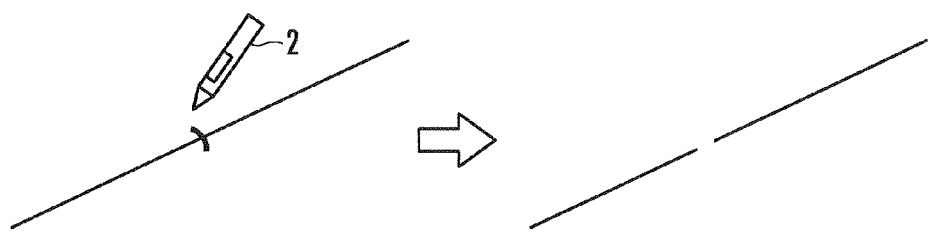
FIG. 5(a) to FIG. 5(c) are illustrative diagrams related to recognition of an element in the drawing mode, respectively.
Figure 5:
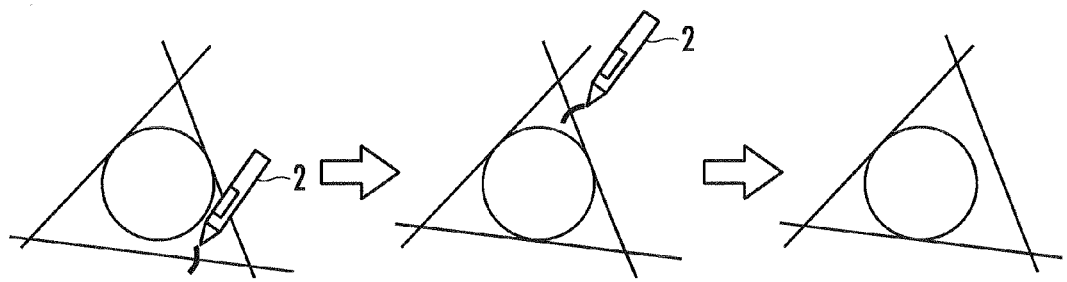
Figure 5:
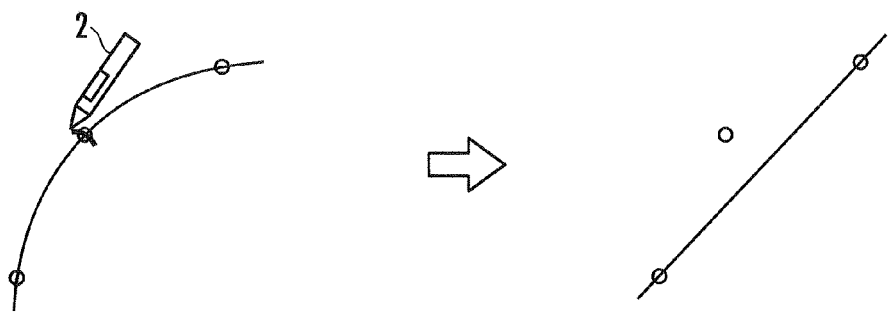

For example, as illustrated in the left side of FIG. 5(a), when the positional trajectory of the pointer is a line segment which chops another line segment serving as the existing element and has a length less than a given value, two sectioned line segments formed by chopping the existed line segment at the chopping position is recognized as a new element, as illustrated in the right side of FIG. 5(a). As illustrated in the left side of FIG. 5(b), when three line segments defining a triangular closed area and a circle tangent to two of the three line segments are recognized as the existing element and the positional trajectory of the pointer illustrated by a heavy line chops the last line segment which is not tangent to the circle, the last line segment which has been moved parallel to be tangent to the circle is recognized as a new element, as illustrated in the middle of FIG. 5(b). Further, as illustrated in the middle of FIG. 5(b), when three line segments defining the triangular closed area and the three line segments are tangent to the circle are recognized as the existing element and the positional trajectory of the pointer illustrated by a heavy line chops either one of the three line segments, the chopped line segment being moved away from the circle is recognized as a new element, as illustrated in the right side of FIG. 5(b). As illustrated in the left side of FIG. 5(c), when a plurality of dots and a line segment passing through the plurality of dots are cognized as the existing element and the positional trajectory of the pointer illustrated by a heavy line overlaps with either one of the plurality of dots, the line segment passing through the plurality of dots except the overlapped dot is recognized as a new element, as illustrated in the right side of FIG. 5(c).

Figure 6:
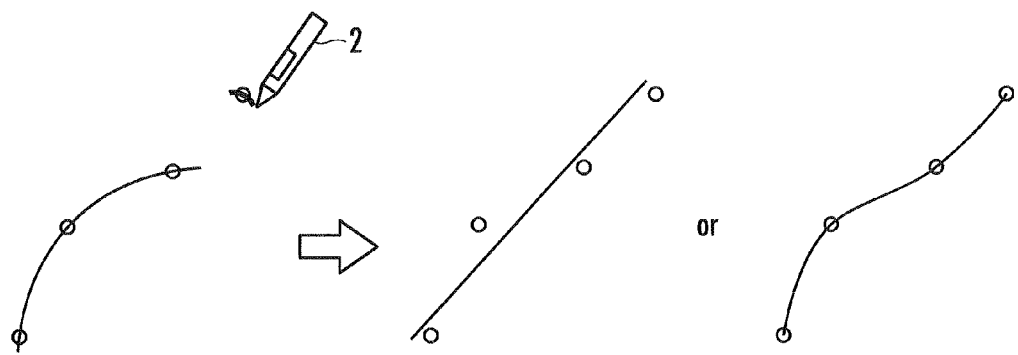
FIG. 6(a) to FIG. 6(c) are illustrative diagrams related to recognition of an element in the drawing mode, respectively.
Figure 6:
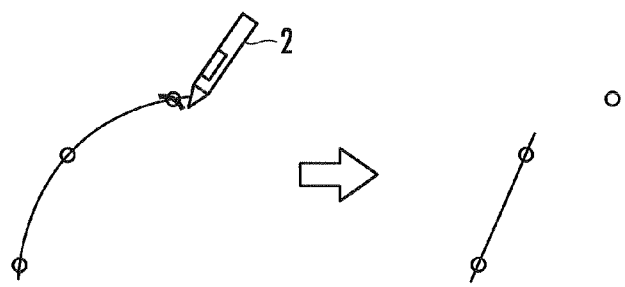
Figure 6:
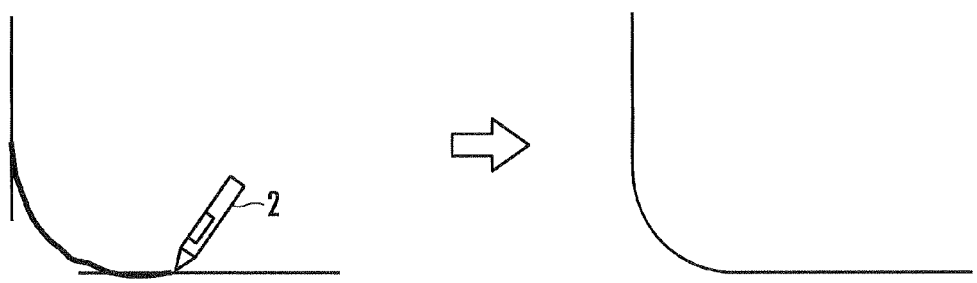

As illustrated in the left side of FIG. 6(a), when a line segment, a plurality of dots on the line segment and a dot separated from the line segment are recognized as the existing element and the positional trajectory of the pointer illustrated by a heavy line overlaps with the dot separated from the line segment, a line segment approximate to all the dots including the plurality of dots on the line segment and the dot separated from the line segment or a curving line segment passing through all the dots is recognized as a new element, as illustrated in the right side of FIG. 6(a). As illustrated in the left side of FIG. 6(b), when a line segment and a plurality of dots on the line segment are recognized as the existing element and the positional trajectory of the pointer illustrated by a heavy line overlaps with either one of the plurality of dots, a line segment passing through the plurality of dots excluding the overlapped dot and the excluded dot are recognized as a new element. As illustrated in the left side of FIG. 6(c), when two separated line segments are recognized as the existing element and the positional trajectory of the pointer illustrated by a heavy line is a curved line segment joining the middle points of the two line segments, one intact line segment which is formed by joining a portion of one line segment to the middle point thereof and a portion of the other line segment to the middle point thereof through the curved line segment is recognized as a new element. It should be noted that the existing element serving as the basis is recognized not only through the positional trajectory of the pointer, it may also be recognized on the basis of data obtained from a recording medium such as DVD or the like outside of the drawing assist device 1 or obtained through internet or the like.

Figure 9:
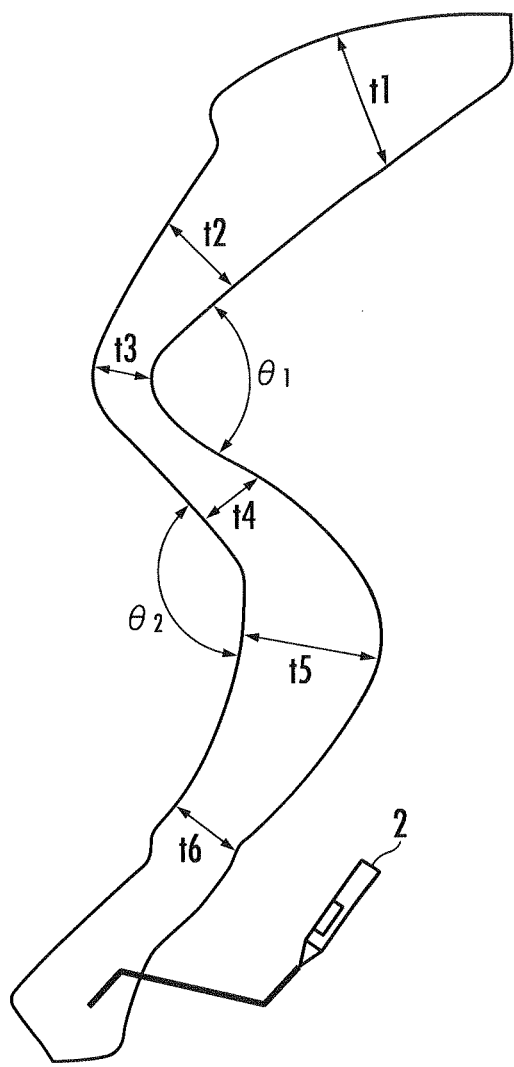
FIG. 9 is a first illustrative diagram of the element and the subject.

Thereafter, the recognized element having the first factor is displayed on the panel (display) 3 (FIG. 2/STEP 006). For example, as illustrated in FIG. 9, the line segment defining a curving closed area is displayed as a new element added or varied by the pen 2.

Figure 10:
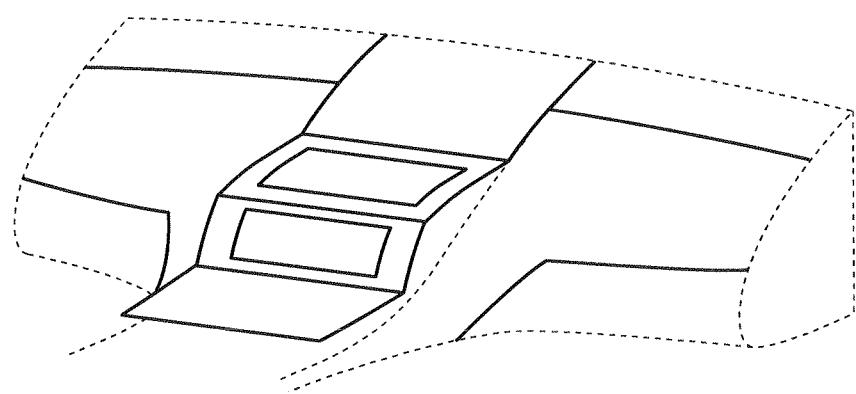
FIG. 10 is a second illustrative diagram of the element and the subject.

As illustrated in FIG. 10, a subject is represented three dimensionally by a plurality of dashed line segments serving as the existing element and a plurality of solid line segments for defining components of the subject are recognized as a new element.

Figure 11:
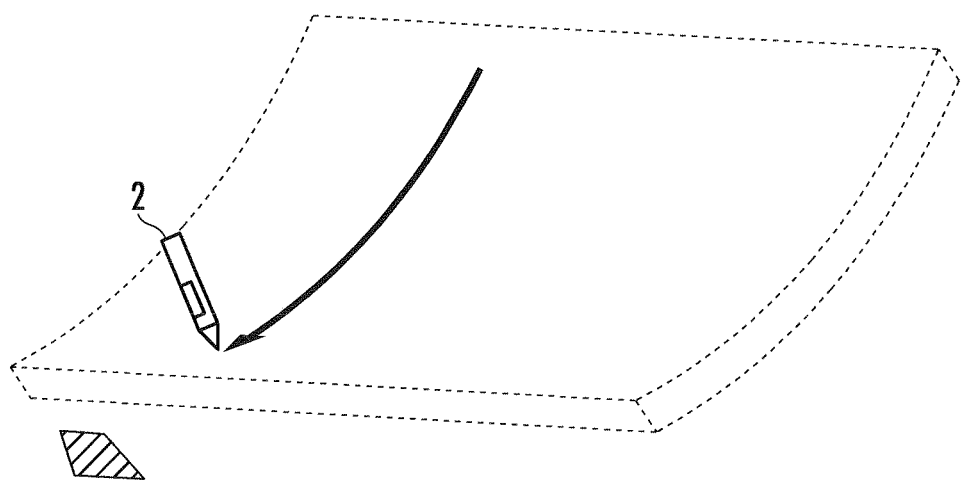
FIG. 11 is a third illustrative diagram of the element and the subject.
Figure 11:
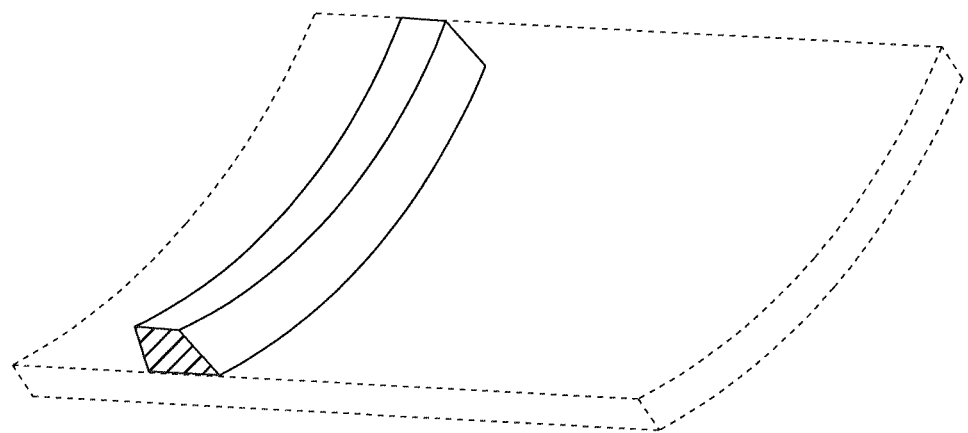

As illustrated in FIG. 11(a), a subject is represented three dimensionally by a plurality of dashed line segments serving as the existing element, the positional trajectory of the pointer is varied on the top of the subject along the arrow and if a polygon down-left the subject is selected, the solid line segments representing a reinforced rib which has a sectional shape corresponding to the selected polygon and is positioned along the positional trajectory of the pointer are recognized as a new element.

When a subject is represented three dimensionally, an angle from which to view the subject (or a direction from which to view a three dimensional subject displayed on the panel 3) may be varied according to the positional trajectory of the pointer or according to the operations by the agent through the operation buttons 12.

Moreover, the second factor of a subject selected by the agent through the operation buttons 12 constituting the second interface or through the panel 3 is recognized (FIG. 2/STEP 008). For example, a category of a subject, such as a front panel, the body, a door, a steering wheel, an ornament or a seat of a vehicle, is recognized as the second factor. In addition, a category of a material constituting the subject in accordance with the category of the subject, such as resin, metal or the like, and a manufacture requirement, such as a tool used in manufacturing, specifications of a die or a working machine, may be recognized as the second factor according to a database search on the basis of the first factor, a component identification serial or the like.

Note that the second factor may be recognized on the basis of the first factor of a subject. For example, the category of a subject, such as the front panel of a vehicle, can be recognized on the basis of the appearance of the subject represent by an element by referring an appearance pattern stored in a data base, in which each appearance is related to each category of a subject. The second factor may be also recognized on the basis of a component identification serial input by the agent through an input device such as a keyboard or the like. Furthermore, it is acceptable to recognize a material such as resin constituting a subject on the basis of the category of the subject recognized as described above by referring to the material of the subject stored in a data base, in which each material is related to each category of a subject.

On the basis of the recognition result on the first factor of an element, a single or a plurality of index values indicating design adequacy of a subject represented by the element is evaluated (FIG. 2/STEP 012). In detail, a part or an entirety of height, width and thickness of the subject, a curvature or angle of a curved position of the subject, an interval between an element constituting one subject and an element constituting the other element, a component or components constituting the subject and the number of the components confined by the element is evaluated partially or entirely as the index value.

In the confirmation mode, categories of an element and an index value serving as the evaluation subject can be selected according to the positional trajectory (gesture) of the pointer recognized through the first interface.

Figure 7:
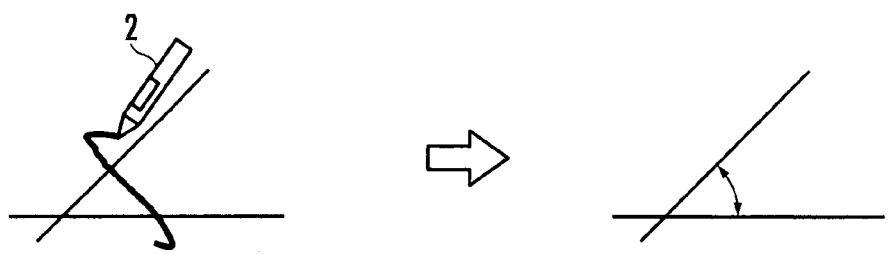
FIG. 7(a) to FIG. 7(c) are illustrative diagrams related to evaluation of a subject in a conformation mode, respectively.
Figure 7:
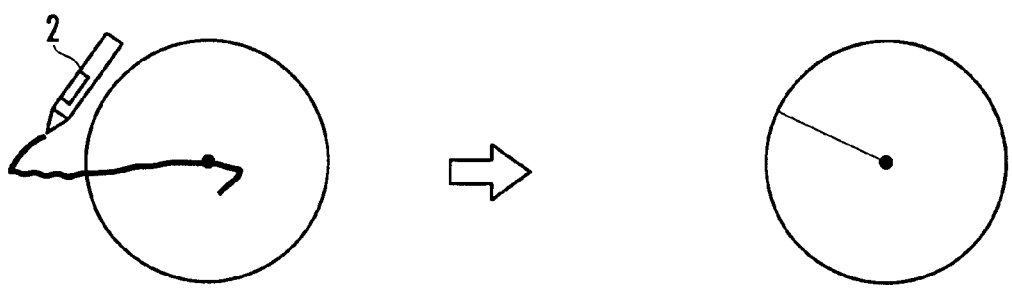
Figure 7:
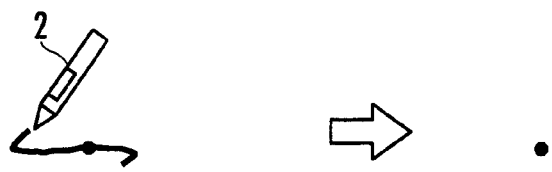

For example, as illustrated in the left side of FIG. 7(a) when two crossed line segments are recognized as the existing element and the positional trajectory of the pointer illustrated by a heavy line is varied to cross the two line segments, an angle formed by the two line segments in a two dimensional or a three dimensional coordinate system is determined as the index value, as illustrated in the right side of FIG. 7(a). As illustrated in the left side of FIG. 7(b), when a circle is recognized as the existing element and the positional trajectory of the pointer illustrated by a heavy line is varied to cross the center point and the circle, a diameter of the circle is determined as the index value, as illustrated in the right side of FIG. 7(b). As illustrated in the left side of FIG. 7(c), when a dot is recognized as the existing element and the positional trajectory of the pointer illustrated by a heavy line is varied to cross the dot, a coordinate value of the dot in a two dimensional or a three dimensional coordinate system is determined as the index value, as illustrated in the right side of FIG. 7(c).

Figure 8:
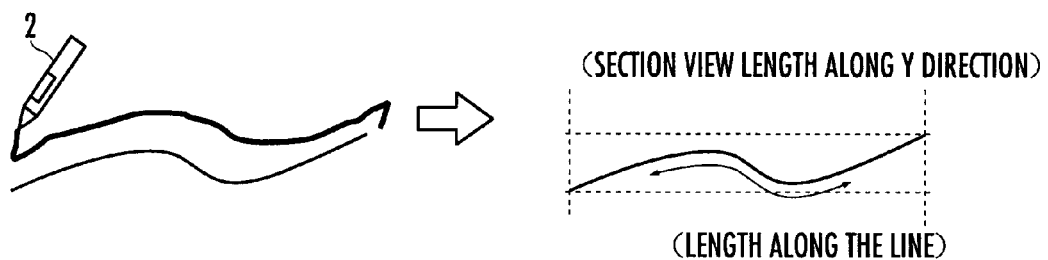
FIG. 8(a) and FIG. 8(b) are illustrative diagrams related to evaluation of a subject in the conformation mode, respectively.
Figure 8:
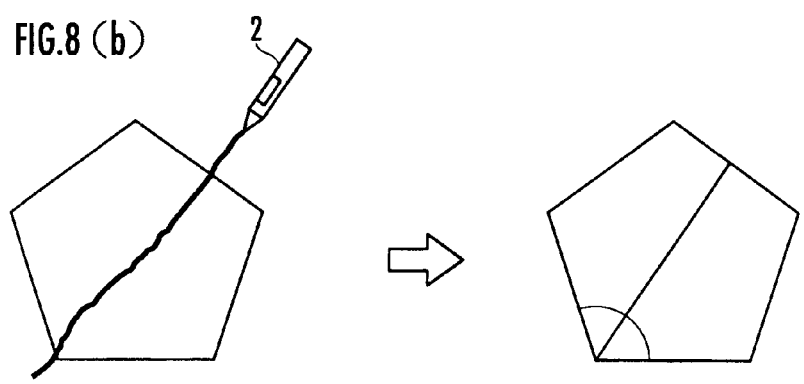

As illustrated in the left side of FIG. 8(a), when a line segment is recognized as the existing element and the positional trajectory of the pointer illustrated by a heavy line is varied by passing close to the line segment, a length of the line segment in a two dimensional or a three dimensional coordinate system is determined as the index value, as illustrated in the right side of FIG. 8(a). As illustrated in the left side of FIG. 8(b), when a polygon is recognized as the existing element and the positional trajectory of the pointer illustrated by a heavy line is varied by crossing one apex and one side of the polygon, split angles of an apical angle split by an approximate line in accordance with the positional trajectory of the pointer at the apex of the polygon and a split ratio of the side length are determined as the index value, as illustrated in the right side of FIG. 8(b).

It is acceptable to recognize plural categories of index values of a single subject according to a single gesture. It is also acceptable to recognize index values at plural locations of a single subject according to a single gesture. For example, as illustrated in FIG. 9, when a line segment defining a closed area is recognized as the existing element and the positional trajectory of the pointer illustrated by a heavy line chops the line segment, thickness of $t1$ to $t6$ at plural locations of the subject element whose shape or the like is defined by the line segment and curvature angles of $\theta1$ and $\theta2$ at two curved locations are calculated as the index values, respectively.

As illustrated in FIG. 10, when a plurality of solid line segments splitting the subject, which is represented three dimensionally by a plurality of dashed line segments serving as the existing element, is recognized as new elements, the number of components of the subject defined by the splitting line segments can be recognized as the index value.

Further, as illustrated in FIG. 11(b), when a plurality of solid line segments representing the rib attached on the subject, which is represented three dimensionally by a plurality of dashed line segments serving as the existing element, is recognized as new elements, the number of the rib or a sectional area thereof, a thickness of an arbitrary location in the rib, a deviation of thickness of the subject complied with the presence of the rib or the like can be recognized as the index value.

When the index value cannot be evaluated due to insufficient elements or the like, processes such as recognition of the positional trajectory of the pointer and the like are iterated until it is possible to evaluate the index value (FIG. 2/STEP 002 to STEP 008). In addition, it is acceptable that whether a request for evaluating an element sent by the agent is present or not, and the index value is evaluated only when the request is present. For example, whether the request is present or not can be determined according to whether the operation button 22 of the pen 2 has been switched to the confirmation mode or not.

Thereafter, on the basis of the second factor of the subject, a reference range is recognized (FIG. 2/STEP 014). Specifically, the reference range is obtained by retrieving a data base, where a design reference or design data of drawings of the past are stored, on the basis of the second factor.

For example, those that can be recognized as the reference range includes: an allowable range of local thickness or overall average thickness of a subject, an allowable range of a curvature angle at a curved location of the subject, an allowable range of number of components of the subject, an allowable range of ribs for reinforcing the subject or the like is recognized as the reference range by considering the material of the subject. The mentioned allowable range is defined from the viewpoint of maintaining the strength or durability of the subject.

Subsequently, whether or not the index value is within the reference range is determined (FIG. 2/STEP 016).

If the determination is positive (FIG. 2/STEP 016 ... YES), a first notification control processing is performed (FIG. 2/STEP 018). Accordingly, when a subject is inadequate in design, a notification thereof to the agent will be omitted or will not be sent thereto. In addition, it is also acceptable to notify the agent that the subject is adequate in design.

On the other hand, if the determination result is negative (FIG. 2/STEP 016 ... NO), a second notification control processing is performed (FIG. 2/STEP 020). Accordingly, when a subject is inadequate in design, a notification thereof will be sent to the agent.

When a subject is inadequate in design, a notification thereof is sent in a form visually perceptible to the agent through displaying a corresponding message on the panel 3, for example. Further, the element which has been determined to be the reason leading the subject to become inadequate in design may be displayed in a visually distinguishable form different from that of the other elements in color, blinking, or the like. In addition, the agent may be notified that the subject is inadequate in design in a form acoustically perceptible by a sound indicating that the subject is inadequate in design broadcasted through a speaker (not shown) disposed in the main body. Furthermore, it is also acceptable to notify the agent that the subject is inadequate in design in a form tactually perceptible by electrifying a vibration circuit (not shown) disposed in the pen 2 to vibrate the pen 2.

If the first factor (parameters and the like) is varied thereafter, the varied first factor is recognized as a new first factor, and whether or not the index value is within the reference range is determined according to the new first factor (refer to FIG. 2/STEP 004, STEP 012, STEP 014 and STEP 016).

Then, the second arithmetic processing element stores or registers the determination result on whether or not the index value is within the reference range, one or both of the index value and the first factor, and the second factor with a relation labeled therebetween in data base (FIG. 2/STEP 022). It is acceptable to set a process such as a confirmation operation by the agent as a requirement for registration to the data base.

According to the drawing assist device 1 exhibiting the above-mentioned functions, the first factor of an element defined according to a positional trajectory of the pointer moved by an agent is determined; subsequently, whether or not a subject represented by the element is inadequate in design is determined; thereafter, an information complied with the determination result is notified to the agent (refer to FIG. 2/STEP 018 and STEP 020). According thereto, the agent can progress the drawing operation while confirming whether or not the subject drawn personally is adequate in design. As a result thereof, such possibility that a design problem is found after the subject has been drawn and the drawing operation should be re-performed can be remarkably reduced, and consequently, improving the drawing efficiency.

The element leading the index value to deviate from the reference range is displayed on the panel (display) 3 in a form distinguishable from the other elements. Accordingly, the agent can know a guide of how to specifically correct or change the first factor (shape or displacement or the like) of the element constituting the subject which has been determined to be inadequate in design. Therefore, according to the guide, for example, a position or posture or the like of a line segment is varied so that a thickness at a designated location of a subject represented by the line segment is within a reference range. As a result thereof, it is possible to remarkably reduce the repeated postal drawing operation, and consequently, improving the drawing efficiency.

Further, if the subject is determined to be inadequate in design (refer to FIG. 2/STEP 016 . . . NO), and the new first factor of the element complied with the positional trajectory of the pointer is recognized thereafter (refer to FIG. 2/STEP 002 to STEP 004), the information complied with the new determination result is output (refer to FIG. 2/STEP 018). Thereby, the agent can progress the drawing operation while appropriately recognizing whether or not the correction or variation on the first factor of the element leads the subject to become adequate in design.

Additionally, it is acceptable that the variation amount of the index value is calculated so as to keep the index value within the reference range, and thereafter the variation amount or the first factor of the element used to fulfill the variation amount is notified to the agent only when the determination result by the controller 4 is negative (refer to FIG. 2/STEP 016 . . . NO). Accordingly, the agent can know a specific correction or variation guide to the first factor (shape or displacement or the like) of the element constituting the subject which has been determined to be inadequate in design. Thereby, according to the guide, for example, it is possible that a position or posture or the like of a line segment is varied so that a thickness at a designated location of a subject represented by the line segment is within a reference range.

It is acceptable that the second arithmetic processing element retrieves either one or both of the index value and the first factor complied with the positive or negative determination result from the data base on the basis of the second factor complied with the element (refer to FIG. 2/STEP 008) and outputs the retrieved information in a form such as displaying on the panel 3 to the agent. Also, it is acceptable that the second arithmetic processing element retrieves the determination result (where the positive determination result and the negative determination result are differentiated) and either one or both of the index value and the first factor, and outputs the retrieved information to the agent.

According thereto, a plurality of candidates, for example, of a first factor (an interval between a pair of line segments (thickness of a plate) or the like) in relation to a second factor (manufacture requirement or the like of the plate component) are displayed and listed on the display 3 on the basis of the second factor complied with an element (the pair of line segments representing the upper surface and the bottom surface, respectively, of the plate component) serving as a subject.

Furthermore, it is acceptable that the second arithmetic processing element outputs a plurality of index values as the retrieved information and recognizes one index value selected by the agent from the plurality of index values, and displays a new element on the display 3 after adjusting the first factor of the new element so as to match with the selected index value. Also, it is acceptable that the second arithmetic processing element outputs a plurality of first factors as the retrieved information and recognizes one first factor selected by the agent from the plurality of first factors, and displays a new element on the display 3 after adjusting the first factor of the new element so as to match with the selected first factor.

According thereto, for example, an element (a pair of parallel line segments) serving as a subject is displayed on the display 3 after the first factor (an interval between the pair of parallel line segments) of the element is adjusted so as to match with a single first factor selected by the agent.

The selection history may be registered in the data base as design information of the corresponding component to be used in future design operation. A person in charge of postal drawing check can know the grounds for defining the dimensions (the first factor) of components that definitions for some specific categories of components are used and some other definitions for the other categories are modified without being restricted by the definitions.

Note that the first factor of an element may be recognized on the basis of the second factor such as a manufacture requirement of a subject or the like.

Figure 12:
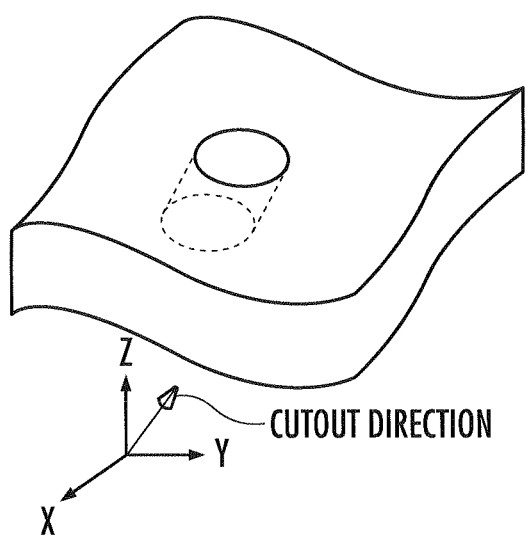
FIG. 12 is a fourth illustrative diagram of the element and the subject.
Figure 12:
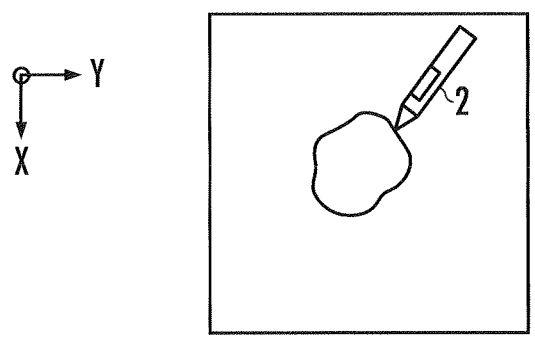
Figure 12:
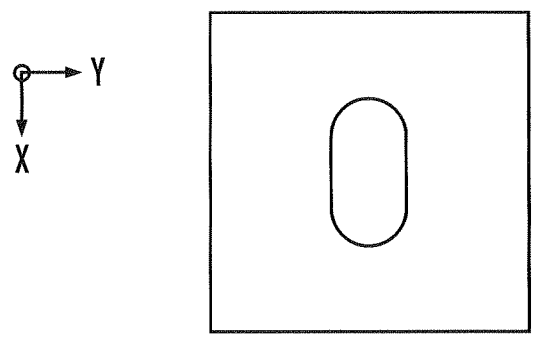

(A) Modifications by Considering not Only Geometrical Similarity but Also Manufacture Requirement As illustrated in FIG. 12(*a*), considerations are given on a case where a plate component opened therein with a penetrated hole is designed. In a rectangular coordinate system with a thickness direction of the component as the z axis, as illustrated by an arrow in FIG. 12(*a*), cutout the hole along an inclined direction with respect to the z axis and the like are defined as a manufacture requirement for the plate component. The manufacture requirement is stored in a data base. As the plate component is viewed from the z direction as illustrated in FIG. 12(b), at an inner side of a rectangular closed curve, the existing element, representing a profile of the hole, when a roughly circular closed curve serving as a new element is hand-drawn with the pen 2, the closed rectangular curve is shaped into the circular closed curve. Thereafter, the circular closed curve is projected in the cutout direction. As a result thereof, as illustrated in FIG. 12(c), an elliptical curve representing the profile of the penetrated hole when viewing the plate component in the z direction is displayed on the panel 3 as the element. It is acceptable to display a circular closed curve representing the profile of the penetrated hole as the element as a result of projecting the circular closed curve in the z direction with respect to the plate component.

Figure 13:
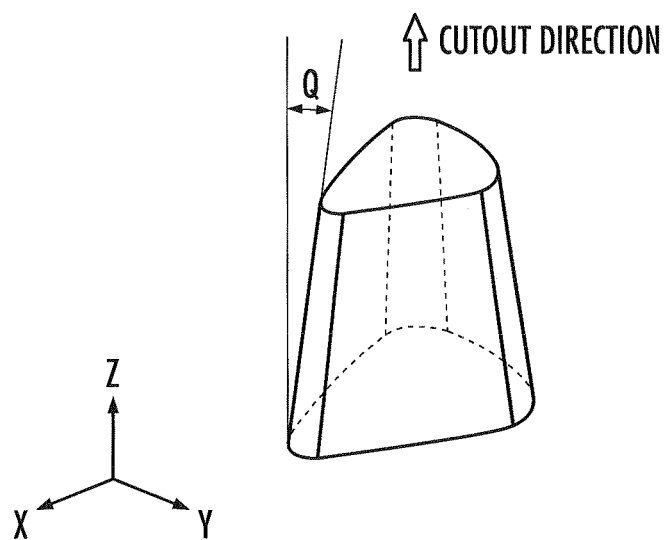
FIG. 13 is a fifth illustrative diagram of the element and the subject.
Figure 13:
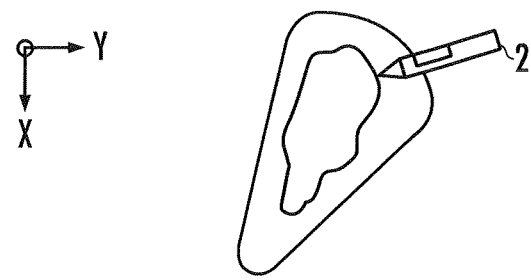
Figure 13:
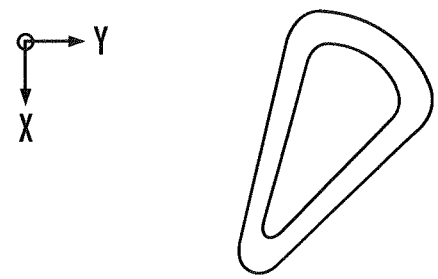

(B) Modifications by Considering not Only Geometrical Offset but Also Manufacture Requirement As illustrated in FIG. 13(a), considerations are given on a case where a cylindrical component (may be hollow inside) gradually tapered upward (+z direction) is designed. As illustrated in FIG. 13(a) by an arrow, in addition to being cut out along the +z direction, an inclination angle θ of side walls with respect to the z axis is confined within a reference angle range Θ and the like are defined as a manufacture requirement for the cylindrical component. As the cylindrical component is viewed from the z direction as illustrated in FIG. 13(b), at an inner side of a closed curve, the existing element, representing a profile of a bottom surface thereof, when a closed curve serving as a new element is hand-drawn with the pen 2, the inner closed curve is shaped to become parallel to the outer closed curve. In addition, an interval between the two closed curve may be adjusted according to a height (may be defined as the manufacture requirement, or may be defined by the agent in the drawing operation) and the reference angle range Θ. As a result thereof, as illustrated in FIG. 13(c), the inner closed curve representing the profile of a top surface of the cylindrical component when viewing the cylindrical component in the z direction is displayed on the panel 3 as the element.

Figure 14:
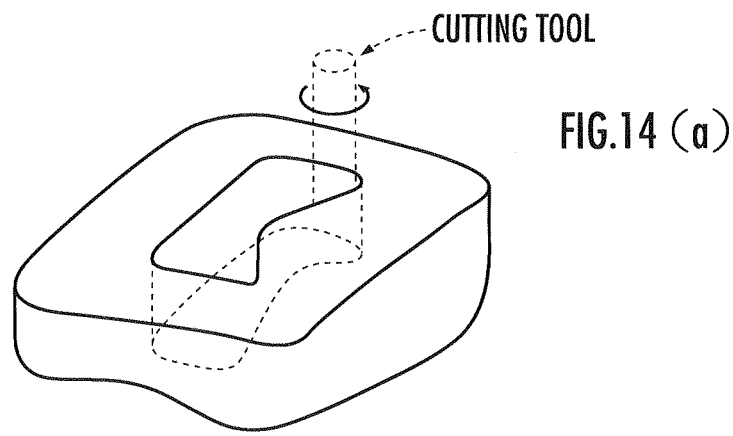
FIG. 14 is a sixth illustrative diagram of the element and the subject.
Figure 14:
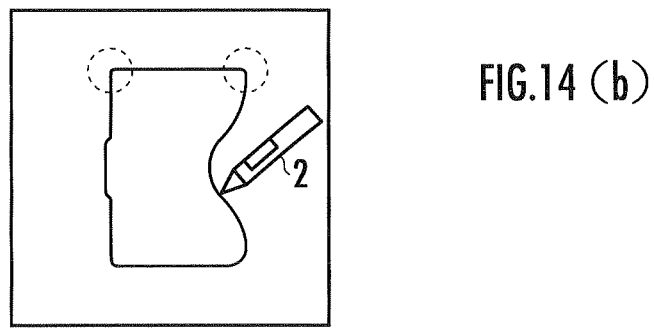
Figure 14:
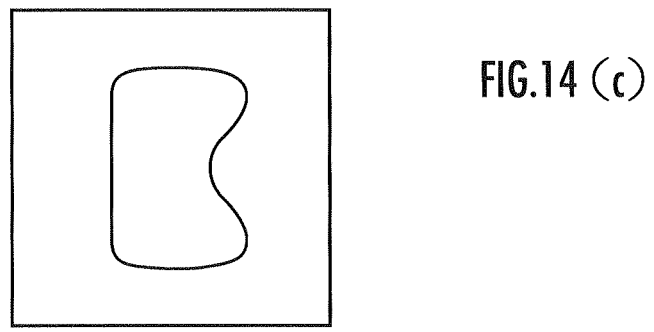

(C) Modifications by Considering not Only Input Shape but Also Manufacture Requirement As illustrated in FIG. 14(a), considerations are given on a case where a plate component at which a hole (or a groove) is provided with a cutting tool (in dashed lines) such as a milling cutter, an end mill or the like is designed. As illustrated in FIG. 14 (a), that a curvature of an arbitrary location at the profile of the hole is smaller than a reference curvature or the like is defined as a manufacture requirement for the plate component. The reference curvature is defined according to a diameter or the like of the end mill. As the plate component is viewed from the z direction as illustrated in FIG. 14(b), at an inner side of a rectangular closed curve, the existing element, representing a profile of the hole, when a closed curve serving as a new element is hand-drawn with the pen 2, the closed curve is shaped into a closed smooth curve. In addition, with respect to the locations (represented by dashed circles in FIG. 14(b)) at the closed curve with curvature beyond the reference curvature, the closed curve is shaped so that the curvature thereof becomes smaller than the reference curvature. As a result thereof, as illustrated in FIG. 14(c), a closed curve representing the profile of the hole when viewing the plate component in the z direction is displayed on the panel 3 as the element.

What is claimed is:

1. A drawing assist device, comprising:
a first interface configured to recognize a positional trajectory of a pointer displayed on the first interface moved by an agent;
a display; and
a controller configured to display on the display an element having a first factor complied with the positional trajectory of the pointer, wherein the first factor comprises one or more of a shape, posture or displacement, or a combination thereof,
wherein the controller is provided with
a first arithmetic processing element configured to recognize the first factor of the element and evaluate a single or a plurality of index values indicating manufacturing characteristics of a subject constructing a product represented by the element on the basis of a recognition result; and
a second arithmetic processing element configured to determine whether or not the index value evaluated by the first arithmetic processing element is confined in a reference range defined on the basis of the manufacturing characteristics of the subject and notify the agent of an information complied with a determination result,
wherein the second arithmetic processing element determines whether or not the index value is confined in the reference range on the basis of a second factor after recognizing the reference range, wherein the second factor comprises a part or an entirety of a material, a category of a subject, a manufacture requirement, an attachment requirement and an assembly requirement.

2. The drawing assist device according to claim 1, wherein the second arithmetic processing element stores the determination result, one or both of the index value and the first factor, and the second factor with a relation labeled therebetween; and
retrieves one or both of the index value and the first factor complied with a positive or a negative determination result, or the determination result and one or both of the index value and the first factor from the data base on the basis of the second factor of a new element, and outputs a retrieved result to the agent.

3. The drawing assist device according to claim 2, wherein the second arithmetic processing element outputs a plurality of the index values as the retrieved result in accordance with the new element recognized by the first arithmetic processing element and recognizes one of the plurality of the index values selected by the agent, and displays the new element on the display after adjusting the first factor of the new subject so as to conform with the selected index value.

4. The drawing assist device according to claim 2, wherein the second arithmetic processing element outputs a plurality of the first factors as the retrieved result in accordance with the new element recognized by the first arithmetic processing element and recognizes one of the plurality of the first factors selected by the agent, and displays the new element on the display after adjusting the first factor of the new element so as to conform with the selected first factor.

5. The drawing assist device according to claim 1, wherein the first arithmetic processing element shapes an initial element in accordance with the positional trajectory of the pointer recognized through the first interface, and recognizes the shaped initial element as the element.

6. The drawing assist device according to claim 1, wherein the second arithmetic processing element recognizes the second factor of the subject on the basis of the first factor thereof.

7. The drawing assist device according to claim 1, further includes a second interface configured to recognize the second factor of the subject appointed by the agent, wherein the second arithmetic processing element recognizes the second factor of the subject through the second interface.

8. The drawing assist device according to claim 1, wherein the second arithmetic processing element calculates a variation amount of the index value necessary to confine the index value in the reference range on a condition that the index value is determined to be deviated from the reference range, and notifies the agent of the variation amount or the first factor of the element for fulfilling the variation amount.

9. The drawing assist device according to claim 1, wherein the second arithmetic processing element displays a message showing that the subject is inadequate in design, or an element leading the index value to deviate from the reference range in a form distinguishable from the other elements on the display.

10. The drawing assist device according to claim 1, wherein the first arithmetic processing element selects a category of the index value as an evaluation subject in accordance with the positional trajectory of the pointer recognized through the first interface.

11. The drawing assist device according to claim 1, wherein under a condition that the subject has been determined to be inadequate in design by the second arithmetic processing element and a new first factor of the element complied with the positional trajectory of the pointer has been recognized by the first arithmetic processing element, the second arithmetic processing element stops notifying that the subject having the new first factor is inadequate in design when the determination result is positive, or notifies that the subject having the new first factor is adequate in design.

12. The drawing assist device according to claim 1, wherein the first arithmetic processing element evaluates partially or entirely a part or an entirety of height, width and thickness of the subject, a curvature or angle of a curved position of the subject, an interval between an element constituting one subject and the element constituting the other subject, a component or components constituting the subject and the number of the components confined by the element as the index value.

13. The drawing assist device according to claim 1, wherein the second arithmetic processing element determines whether or not a request for the element by the agent is present, and determines whether or not the subject is adequate in design on an additional condition if the request has been determined to be present.

14. The drawing assist device according to claim 1, wherein the first arithmetic processing element recognizes the first factor of the element in accordance with the positional trajectory of the pointer recognized through the first interface, or recognizes a variation behavior of the first factor of the element and thereafter recognizes the second factor of the element varied according to the variation behavior.

15. The drawing assist device according to claim 1, further includes a pen-like drawing tool, wherein the first interface is provided with a pressure sensitive or a touch sensitive panel; and the first arithmetic processing element recognizes a positional trajectory of contacting positions of the drawing tool on the panel as the positional trajectory of the pointer.

16. A drawing assist method, comprising steps of:
recognizing a positional trajectory of a pointer displayed on an interface moved by an agent;
recognizing a first factor of an element complied with the positional trajectory of the pointer;
displaying on the interface the element having the first factor;
evaluating a single or a plurality of index values indicating manufacturing characteristics of a subject constructing a product represented by the element on the basis of the first factor;
determining whether or not the index value is confined in a reference range defined on the basis of the manufacturing characteristics of the subject and a second factor after recognizing the reference range, wherein the second factor comprises a part or an entirety of a material, a category of a subject, a manufacture requirement, an attachment requirement and an assembly requirement; and
notifying the agent of an information complied with a determination result.

17. A computer program product, comprising:
a non-transitory computer-readable medium comprising:
at least one instruction for causing a computer to recognize a positional trajectory of a pointer displayed on an interface moved by an agent;
at least one instruction for causing the computer to recognize a first factor of an element complied with the positional trajectory of the pointer;
at least one instruction for causing the computer to display on the interface the element having the first factor;
at least one instruction for causing the computer to evaluate a single or a plurality of index values indicating manufacturing characteristics of a subject constructing a product represented by the element on the basis of the first factor;
at least one instruction for causing the computer to determine whether or not the index value is confined in a reference range defined on the basis of the manufacturing characteristics of the subject and on the basis of a second factor after recognizing the reference range, wherein the second factor comprises a part or an entirety of a material, a category of a subject, a manufacture requirement, an attachment requirement and an assembly requirement; and
at least one instruction for causing the computer to notify the agent of an information complied with a determination result.

* * * * *